July 3, 1951
A. G. BELDEN
2,559,531
GRINDING MACHINE
Filed Aug. 18, 1948
2 Sheets-Sheet 1
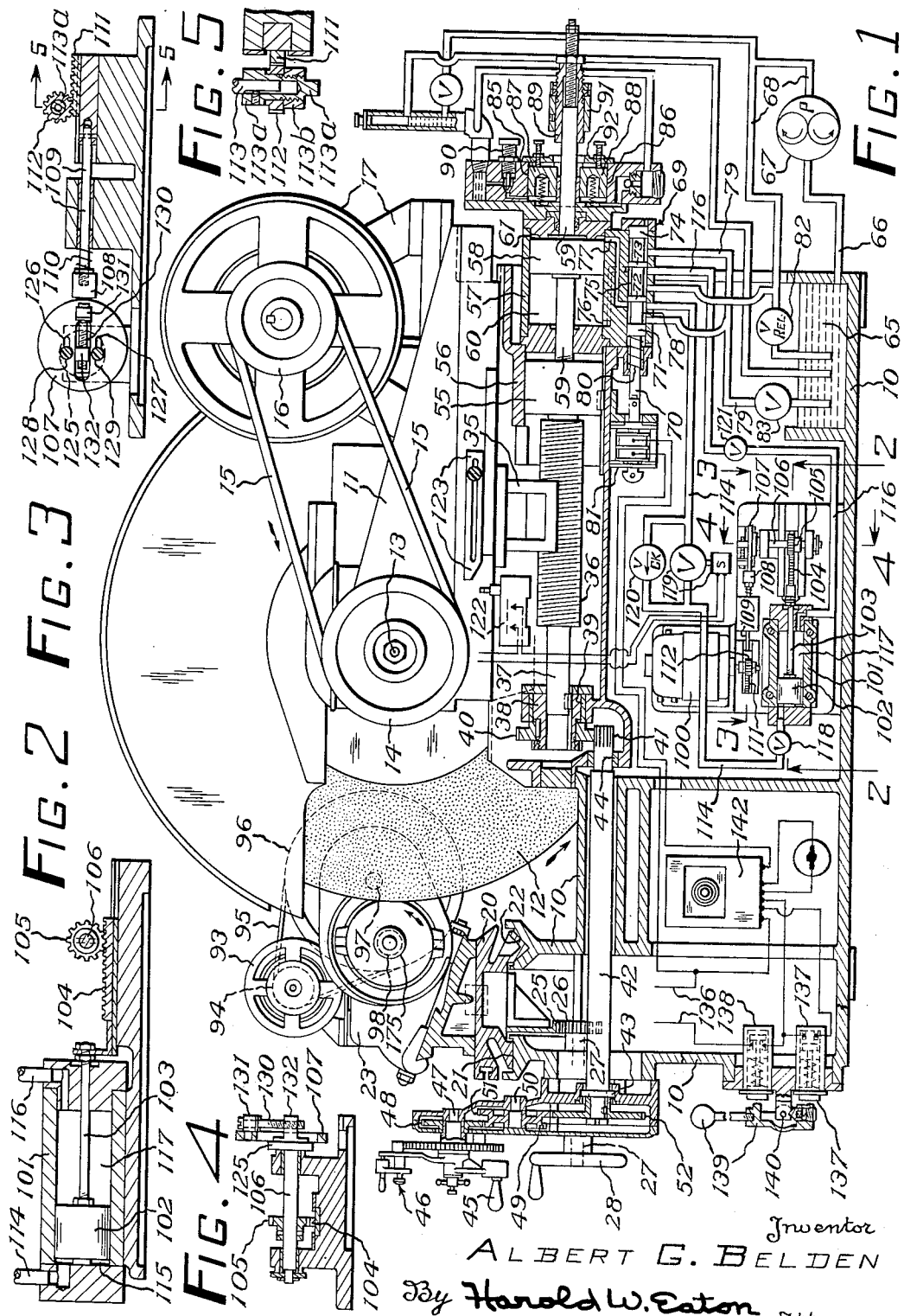
Inventor
ALBERT G. BELDEN
By Harold W. Eaton
Attorney

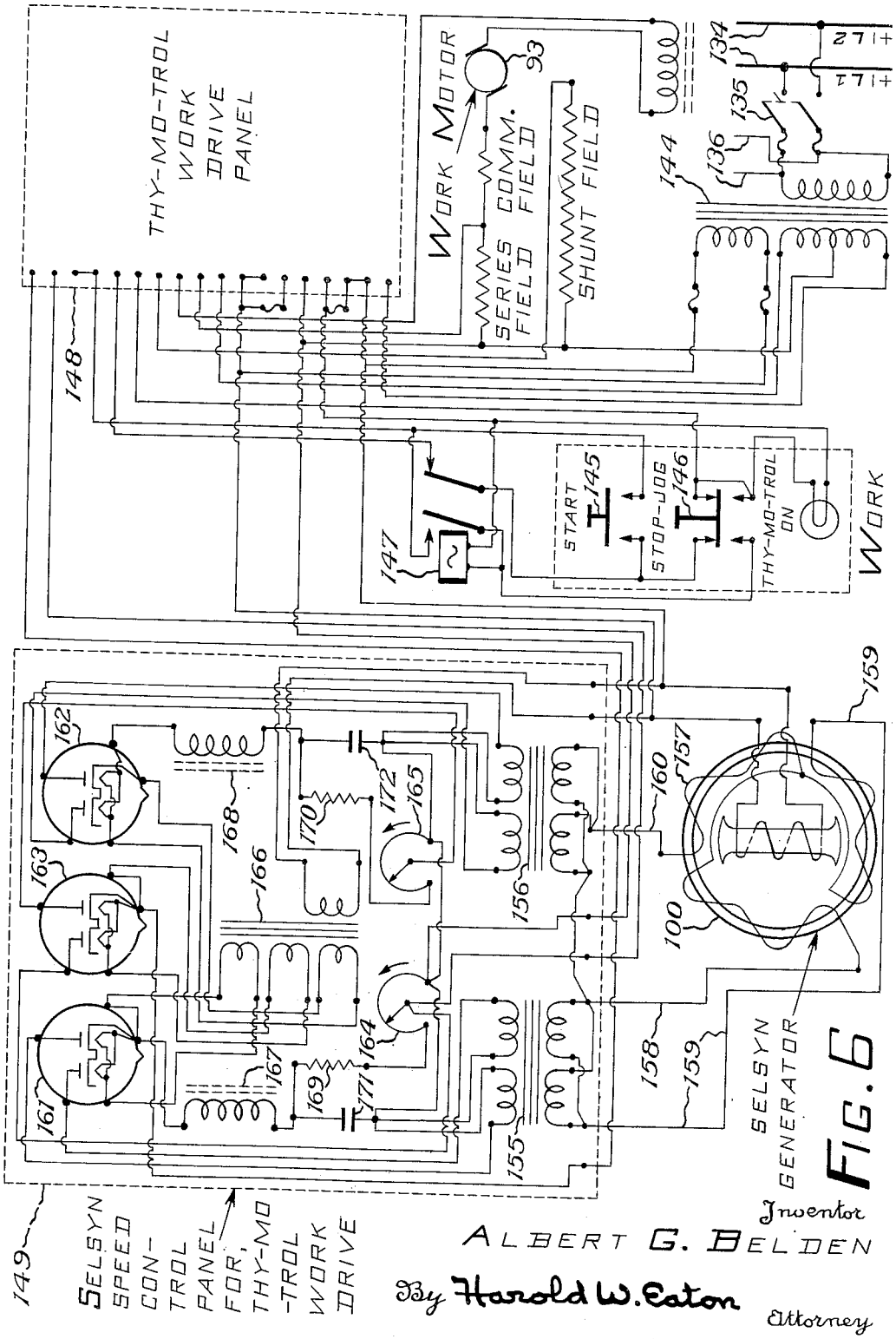

Patented July 3, 1951

2,559,531

UNITED STATES PATENT OFFICE 2,559,531

GRINDING MACHINE

Albert G. Belden, Worcester, Mass., assignor to Norton Company, Worcester, Mass., a corporation of Massachusetts Application August 18, 1948, Serial No. 44,929

8 Claims. (Cl. 51—95)

The invention relates to grinding machines, and more particularly to a work driving and controlling mechanism for a cylindrical type grinding machine.

One object of the invention is to provide a simple and thoroughly practical work driving and controlling mechanism for a cylindrical type grinding machine. Another object is to provide a work driving and controlling mechanism for producing a continuously diminishing speed of the work piece during a grinding cycle. Another object is to provide a work driving mechanism which is arranged automatically and continuously to change the speed of rotation of the work from an initial grinding speed to a final grinding speed during the grinding operation. Another object of the invention is to provide an electrically controlled work driving mechanism automatically to produce a gradually and continuously diminishing work speed. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a transverse vertical sectional view through a grinding machine embodying the invention, showing the wheel feeding mechanism and part of the control apparatus for the work driving mechanism;

Fig. 2 is a horizontal sectional view, on an enlarged scale, taken approximately on the line 2—2 of Fig. 1, showing the hydraulic actuating mechanism for the work rotation control;

Fig. 3 is a horizontal sectional view, on an enlarged scale, taken approximately on the line 3—3 of Fig. 1;

Fig. 4 is a vertical sectional view, on an enlarged scale, taken approximately on the line 4—4 of Fig. 1;

Fig. 5 is a fragmentary sectional view, taken approximately on the line 5—5 of Fig. 3; and Fig. 6 is an electrical diagram of the work driving and controlling apparatus therefor.

A grinding machine has been illustrated in the drawings comprising a base 10 which serves as a support for a transversely movable wheel slide 11. The wheel slide 11 serves as a support for a rotatable grinding wheel 12 which is mounted on one end of a rotatable wheel spindle 13. The other end of the wheel spindle 13 is provided with a pulley 14 which is connected by V-belts 15 with a motor pulley 16 mounted on an electric motor 17 which is adjustably supported on the upper surface of the wheel slide 11.

The base 10 also serves as a support for a longitudinally reciprocable work table 20. A flat way 21 and a V-way 22 are provided on the base 10 for slidably supporting the work table 20. The work table 20 serves as a support for a headstock 23 which will be more fully described hereinafter.

A manually operable table traversing mechanism is provided for traversing the table 20 longitudinally to position a work piece in the desired relationship with the grinding wheel 12. This mechanism may comprise a rack bar 25 depending from the under side of the work table 20. The rack bar 25 meshes with a gear 26 mounted on the inner end of a rotatable shaft 27. A manually operable traverse wheel 28 is mounted on the outer end of the shaft 27 by means of which the table 11 may be traversed longitudinally relative to the base 10 in either direction depending upon the direction of rotation of the hand wheel 28.

A wheel feeding mechanism is provided for manually feeding the grinding wheel toward and from the work comprising a half nut 35 which meshes with a rotatable feed screw 36. A reduced integral feed screw shaft 37 projects toward the front of the machine and is slidably keyed within a rotatable sleeve 38. The sleeve 38 is rotatably journaled in a bearing 39 which is fixedly mounted relative to the base 10. A gear 40 is keyed on the sleeve 39 and meshes with a pinion 41 formed on the inner end of a rotatable shaft 42. The shaft 42 is journaled in bearings 43 and 44 which are fixedly mounted relative to the base 10. A feed wheel 45 having a micrometer adjusting device 46 is rotatably supported on a stud 47. A gear 48 is mounted to rotate with the feed wheel 45 and meshes with a gear 49. The gear 49 is rotatably supported on a stud 50. A gear 51 is formed integrally with the gear 49 and meshes with a gear 52 which is keyed on the outer end of the shaft 42. The micrometer adjusting mechanism 46 and the hand wheel 45 are substantially identical with that shown in the expired U. S. patent to Norton No. 762,838 dated June 14, 1904, to which reference may be had for details of disclosure not contained herein.

It is desirable to provide a power operated mechanism for rapidly moving the grinding wheel slide 11 toward and from an operative position and for controlling the infeeding movement of the grinding wheel 12 during a grinding operation. In the preferred construction, a hydraulically operated mechanism is provided for controlling the axial movement of the feed screw 36. The rear end of the feed screw 36 is rotatably journalled in a sleeve 55 which is slidably keyed within an aperture formed in a frame 56. A fluid pressure cylinder 57 is fixedly mounted relative to the frame 56 and contains a slidably mounted piston 58 which is connected by means of a piston rod 59 with the slidably mounted sleeve 55. A cylinder chamber 60 and a cylinder chamber 61 are formed at opposite ends of the cylinder 58.

A fluid pressure system is provided for supplying fluid under pressure to actuate the piston 58. This system may comprise a reservoir 65 formed within the base 10 of the machine. Fluid is drawn from the reservoir 65 through a pipe 66 by means of a motor driven fluid pump 67. The pump 67 forces fluid under pressure through a pipe 68 to a feed control valve 69. The control valve 69 is a piston type control valve comprising a valve stem 70 having valve pistons 71, 72, 73 and 74 formed integrally therewith. Fluid under pressure passing through the pipe 68 enters a valve chamber 75 located between the valve pistons 72 and 73 and passes through a passage 76 into the cylinder chamber 60 to move the piston 58 toward the right into a rearward or inoperative position. During this movement of the piston, fluid within the cylinder chamber 61 is exhausted through a passage 77, through a valve chamber 78 formed between the valve pistons 71 and 72, and exhausts through a pipe 79 into the reservoir 65. A compression spring 80 normally serves to hold the valve stem 70 in its right hand end position and a solenoid 81 is provided which when energized in a manner to be hereinafter described serves to shift the valve stem 70 toward the left to initiate a rapid approaching movement of the piston 58, the wheel slide 11 and the grinding wheel 12.

A fluid pressure feed regulating mechanism is provided for modifying the rapid approaching movement caused by the piston 58 to obtain a controlled and predetermined feeding movement of the grinding wheel 12. This mechanism may comprise a self-contained dash pot feed regulator comprising a pair of dash pot cylinders 85 and 86 which are arranged on diametrically opposite sides of a rearwardly extending portion of the piston rod 59. The dash pot cylinders 85 and 86 contain dash pot pistons 87 and 88 respectively. The dash pot pistons 87 and 88 are normally held in rearward or right hand positions by means of compression springs. The rapid approaching movement of the wheel as governed by movement of the piston 58 continues until an adjustable collar 89 carried by the right hand end of the piston rod 59 engages the ends of the dash pot pistons 87 and 88 after which fluid exhausts from the dash pot cylinders through a needle valve 90. By throttling the exhaust of fluid from the dash pot cylinders 85 and 86, the rapid approaching movement of the piston 58 may be reduced to a desired and predetermined feeding movement as governed by the setting of the needle valve 90. It will be readily apparent from the foregoing disclosure that by adjustment of the needle valve 90, the rate of grinding feed may be readily adjusted as desired.

The grinding infeed of the wheel 12 continues until a positive stop collar 91 adjustably mounted on the sleeve 89 engages a stop surface 92 formed on the end cap of the dash pot cylinders 85 and 86. The positive stop collar 91 serves to positively stop the forward advance of the grinding wheel 12 so that the wheel may be held stationary for a final or finish grinding operation, the period of which is automatically controlled in a manner to be hereinafter described.

The headstock 23 is preferably driven by an adjustable speed compound wound D. C. electric motor 93. The motor 93 is provided with a driving pulley 94 which is connected by means of V-belts 95 with a pulley 96 carried by a shaft 97. The shaft 97 is drivingly connected to rotate a headstock spindle 98 by means of a belt drive (not shown).

In order to obtain an automatic continuously diminishing speed of the work during a grinding operation, a suitable electric control apparatus is provided for the headstock motor 93. This mechanism may comprise a Selsyn generator 100 which is arranged through a Selsyn control panel, to be hereinafter described, to control an electronic control apparatus so as to provide a continuously diminishing speed of the headstock motor 93 as the grinding operation proceeds. By varying the position of the Selsyn generator rotor, an alternating current excitation voltage is impressed on the Selsyn primary winding which induces unequal voltages in the Selsyn secondary windings depending on the position of the primary rotor. These induced voltages, varying by a mechanical positioning of the rotor, serve to produce the desired diminishing speed of the headstock motor 93. The control mechanism for the Selsyn rotor may comprise a hydraulically operated mechanism comprising a cylinder 101 which contains a slidably mounted piston 102. The piston 102 is connected to one end of a piston rod 103, the other end of which is connected to a slidably mounted rack bar 104. The rack bar 104 meshes with a gear 105 mounted on one end of a rotatable shaft 106. The other end of the shaft 106 supports an adjustably mounted eccentric 107, the adjustment of which will be described hereinafter. A follower 108 engages the periphery of the eccentric 107 and is connected to one end of a slide rod 109. A compression spring 110 serves normally to maintain the follower 108 in operative engagement with the peripheral surface of the eccentric 107. The follower 108 is mounted on one end of the slide rod 109, the other end of which is connected to a rack bar 111. The rack bar 111 meshes with a gear 112 which is mounted on the outer end of a rotor shaft 113 of the Selsyn generator 100. To facilitate adjustment of the rotor of the Selsyn generator 100 relative to the actuating mechanism therefor, a flanged sleeve 113a is keyed on the rotor shaft 113. The gear 112 is supported on the sleeve 113a and is held in position thereon by means of a collar 113b. It will be readily apparent that by loosening the collar 113b, the sleeve 113a may be given a rotary adjustment to adjust the rotor shaft 113 as desired.

Fluid under pressure is supplied to the cylinder 101 from the feed control valve 69. A pipe 114 connects the valve chamber 78 of the feed control valve 69 with a cylinder chamber 115 formed at the left hand end of the cylinder 101. A pipe 116 connects the valve chamber 75 with a cylinder chamber 117 formed at the right hand end of the cylinder 101. A throttle valve 118 is provided in the pipe line 114 to facilitate adjusting the flow of fluid through the pipe 114 into the cylinder chamber 115. A normally closed solenoid valve 119 is also provided in the pipe 114 which serves to facilitate starting movement of the piston 102 in a manner to be hereinafter described after a predetermined rapid approach of the grinding wheel has moved the wheel into position to engage the surface of the work being ground. A ball check valve 120 is provided to by-pass the solenoid valve 119 so that on the return stroke of the piston 102, that is toward the left (Figs. 1 and 2), fluid may pass unrestricted through the pipe 114 even though the valve 119 is closed. A throttle valve 121 is provided in the pipe 116 to facilitate adjusting the fluid passing through the pipe 116 as desired. By adjustment of the throttle valves 118 and 121, the speed of movement of the piston 102 may be varied as desired. If it is desired to render the Selsyn generator 100 inoperative, both of the valves 118 and 121 may be closed so that no motion of the piston 102 is permitted.

To facilitate a rapid approaching movement of the grinding wheel before the Selsyn generator 100 starts movement, a suitable electric control mechanism is provided comprising a normally open limit switch 122 mounted in the base 10 of the machine. An adjustable cam or dog 123 is adjustably mounted on the wheel slide 11 so that when a forward approaching movement of the wheel slide 11 is initiated, the rapid approaching movement will continue and the speed of rotation of the work drive motor 93 will be maintained at its initial speed until the adjustable cam 123 engages and closes the normally open limit switch 122 to energize and open the solenoid valve 119. When the solenoid valve 119 is opened, fluid under pressure may pass from the valve chamber 78 through the pipe 114, through the throttle valve 118 into the cylinder chamber 115 to move the piston 102 toward the right. The movement of the piston 102 toward the right serves through the rack and gear mechanism above described to transmit a controlled rotary motion to the rotor of the Selsyn generator 100 thereby producing a continuously reducing speed of the motor 93 during the grinding operation.

During movement of the piston 102 toward the right, fluid within the cylinder chamber 117 exhausts through the pipe 116, through the valve 121, into the valve chamber 75 and passes out through the pipe 79 into the reservoir 65.

In order to adjust the rotary motion imparted to the rotor of the Selsyn generator 100, it is desirable to provide an adjustable mounting for the eccentric 107 so that it may be adjusted in a direction normal to the shaft 106. The shaft 106 is provided with an integral flange 125. The eccentric 107 is provided with a pair of parallel elongated slots 126 and 127. A pair of screws 128 and 129 pass through elongated slots 126 and 127 respectively and are screw threaded into the flange 125. The screws 128 and 129 serve to clamp the eccentric 107 in adjusted position on the flange 125. To facilitate a precise adjustment of the eccentric 107, an adjusting screw 130 is carried by a boss 131 which is fixedly mounted on the eccentric 107. The screw 130 meshes with a nut 132 which is fixedly supported on the end of the shaft 106. To adjust the position of the eccentric 107 relative to the shaft 106 it is merely necessary to loosen clamping screws 128 and 129 and then to adjust the screw 130 so as to position the eccentric 107 as desired. After the desired adjustment has been made, the clamping screws 128 and 129 may again be clamped to lock the eccentric in adjusted position relative to the shaft 106.

Electric power is supplied from any suitable source through the power lines 134 (Fig. 6) and a main control switch 135. From the main switch 135 current flows through lines 136 (Fig. 6) to lines 136 (Fig. 1) to control the grinding wheel feeding mechanism of the machine. A start switch 137 and a stop switch 138 are arranged to be actuated by a pivotally mounted control lever 139 which is supported on a stud 140 on the front of the machine base 10. When the lever 139 is rocked in a counter-clockwise direction to actuate the start switch 37, current is passed to energize an electric time delay relay 142 which is arranged to control the over-all feeding cycle including the rapid approaching movement, the slower grinding infeed and the dwell of the grinding wheel 12 which occurs thereafter before the wheel is removed to a rearward or inoperative position. The time relay 142 is one of the standard electrically operated adjustable time delay relays, such as that known as the "Microflex" instantaneous reset timer manufactured by the Eagle Signal Corporation of Moline, Illinois. The grinding wheel feeding mechanism above described together with the time delay relay 142 are identical with that shown in the prior U. S. patent to B. H. Goehring No. 2,151,660 dated March 21, 1939, to which reference may be had for details of disclosure not contained herein.

When the time delay relay 142 is energized at the start of a grinding cycle, a circuit is closed to energize the solenoid 81 so as to shift the control valve 69 toward the left so as to initiate a rapid approaching movement of the grinding wheel. The rapid approaching movement continues as above described until the adjustable sleeve 89 engages the ends of the dash pot pistons 87 and 88 after which the rapid approaching movement of the grinding wheel 12 is slowed down to a predetermined grinding speed which continues until the positive stop sleeve 91 engages the stop surface 92 which positively limits the infeed of the grinding wheel and allows the grinding wheel to remain stationary until the time delay relay 142 after a predetermined time interval breaks the circuit so as to deenergize the solenoid 81 after which the released compression of the spring 80 shifts the valve 69 toward the right into the position illustrated in Fig. 1 thus terminating a grinding cycle.

Power from the main switch 135 is also supplied to a transformer 144 which is connected to supply electric current to operate and control the headstock motor 93. A start switch 145 and a stop-jog switch 146 are provided for controlling the starting, stopping and jogging of the headstock motor 93. When the start switch 145 is closed the rotation of the headstock motor 93 is started. When the stop-jog switch 146 is shifted to close the jog contacts, a relay switch 147 is energized to close a circuit so as to jog the headstock motor 93. Assuming that the rotor of the Selsyn generator 100 is in a starting position, the headstock motor 93 will be started and run at a desired initial speed.

An electronic control apparatus 148 such as a Thy-Mo-Trol manufactured by the General Electric Company and covered by the U. S. patent to E. E. Moyer et al. No. 2,312,117 is provided for controlling the speed of the headstock motor 93. The Thy-Mo-Trol control apparatus contained in the panel 148 is substantially identical with that shown in the U. S. patent above referred to to which reference may be had for details of disclosure not contained herein.

In order to produce a constantly diminishing speed of the headstock motor 93, the manually operable potentiometer of the electronic control panel is replaced by the Selsyn generator 100 and the Selsyn control panel 149 (Fig. 6).

In operation an alternating current excitation voltage impressed on the Selsyn primary winding induces unequal voltages in the Selsyn secondary windings depending on the position of the primary motor. These induced voltages varying by the mechanical position of the rotor as controlled by the cycle cam or eccentric mechanism above described set up currents which are fed into the Selsyn control panel 149. These generated signals are then stepped up and rectified to the proper value necessary for a reference voltage to connect with the headstock drive motor 93 and the electronic control panel 148. This reference voltage or speed signal, varying as the Selsyn rotor changes position, replaces the reference voltage variable by manual potentiometer method, and is fed to the usual voltage divider circuit normally controlling the amplifier tube for the armature voltage thyratron tubes. Thus the D. C. motor speed is a function of the angular displacements of the Selsyn rotor.

The Selsyn speed control panel 149 consists of a pair of transformers 155 and 156 whose primary windings are connected in series. The legs of the three star-connected secondary winding 157 of the Selsyn generator 100 are connected to the transformers 155 and 156 in such a manner that one leg 158 of the Selsyn star-connected windings is hooked to the mid point of the two tied-in transformer primaries, the second leg 159 is connected to one end of the transformer hook-up and the third leg 160 to the remaining end of the transformer hook-up.

The double winding secondaries of the transformers 155 and 156 are in turn independently hooked-up to each plate of two twin diode 6X5GT tubes 161 and 162 to obtain a full wave rectified signal. A third twin diode 6X5GT tube 163, whose cathode is one side of the output reference voltage, and whose plate circuits are adjusted by potentiometers 164 and 165, which effectively varies the number of degrees rotation necessarily made by the rotor of the Selsyn generator 100 before maximum output voltage is reached, constitutes the other line of the reference voltage. The value of this voltage can be made equal to the reference voltage of the main electronic control panel 148 to which it is connected by adjusting the potentiometers 164 and 165 for maximum displacements of the rotor of the Selsyn generator 100.

A third transformer 166 for tube filament voltage supply, two reactors 167 and 168, two resistors 169 and 170, and two capacitors 171 and 172 necessary for circuit performance complete the Selsyn control panel assembly.

The operation of this improved grinding machine and work rotating mechanism will be readily apparent from the foregoing disclosure. Assuming the parts to have been all previously adjusted for a grinding operation, a work piece 175 is inserted in the machine and the wheel driving motor 17 is started to rotate the grinding wheel 12. The start switch 145 is then closed to start the headstock motor 93 which rotates at an initial set speed preferably at a speed normally used for a rough grinding operation. The control lever 139 is then rocked in a counterclockwise direction (Fig. 1) to close the circuit to energize electric time delay relay 142 which in turn serves to energize the solenoid 81 so as to shift the stem 70 of the feed control valve 69 toward the left so that fluid under pressure from the pump 67 passing through the pipe 68 will pass through the valve chamber 75, through the passage 77 into the cylinder chamber 61 to cause the piston 58 to move rapidly toward the left to cause a rapid approaching movement of the grinding wheel 12. The rapid approaching movement continues, as above described, until the sleeve 89 picks up the dash pot pistons 87 and 88 to slow down the rapid approaching movement to a predetermined grinding feed. At the same time the dog or cam 123 carried by the wheel slide 11 closes the normally open limit switch 122 to energize and open the solenoid valve 119 so that fluid entering the valve chamber 75 may now pass through the pipe 114 into the cylinder chamber 115 to move the piston 102 toward the right thereby transmitting motion at a controlled rate to rotate the rotor of the Selsyn generator 100 which serves in a manner above described automatically to produce a gradually diminishing speed of the work driving motor during the grinding operation. The grinding cycle continues until the time delay relay 142 after a predetermined time interval has lapsed breaks the circuit to deenergize the solenoid 81 thus releasing the compression of the spring 80 to return the valve stem 70 of the control valve 69 into the position shown in Fig. 1 to cause a rapid rearward movement of the piston 58 and the grinding wheel 12. During this movement fluid under pressure in the pipe 68 enters the valve chamber 75 in the feed control valve 69 and passes through the passage 76 into the cylinder chamber 60. At the same time fluid under pressure is passed into the cylinder chamber 60 to cause a rearward movement of the grinding wheel 12, fluid under pressure is also passed through the pipe 116 into the cylinder chamber 117 to cause the piston 102 to move toward the left into its initial position as shown in Fig. 1 thereby returning the Selsyn rotor to its initial or maximum speed position.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a cylindrical-type grinding machine having a transversely movable wheel slide, a rotatable grinding wheel thereon, a feeding mechanism to move said slide in either direction, a rotatable work support including a headstock rotatably to support a cylindrical-type work piece for grinding the periphery thereof, an adjustable speed headstock motor to rotate a work piece to be ground, control apparatus for said motor including a speed adjusting control apparatus, and means independent of the transverse movement of the wheel slide which is arranged automatically to actuate said speed adjusting control apparatus so as to produce a diminishing speed of said motor and work piece from a rough grinding to a finish grinding speed during a grinding cycle.

2. In a cylindrical-type grinding machine having a transversely movable wheel slide, a rotatable grinding wheel thereon, a fluid pressure piston and cylinder to move said slide in either direction, a rotatable work support including a headstock rotatably to support a cylindrical-type work piece for grinding the periphery thereof, an adjustable speed headstock motor to rotate a work piece to be ground, an electronic control apparatus for regulating the speed of said work driving motor, means including a Selsyn generator which is operatively connected to actuate said electronic control apparatus so as to gradually reduce the peripheral speed of the work piece relative to the speed of the grinding wheel from a rough grinding to a finish grinding speed during a grinding operation.

3. In a grinding machine having a rotatable work support including a headstock, a transversely movable wheel slide, a rotatable grinding wheel thereon, a fluid pressure piston and cylinder to feed said slide in either direction, an adjustable speed headstock motor to rotate a work piece to be ground, an electronic control apparatus for regulating the speed of said work driving motor, means including a Selsyn generator having a rotor which is operatively connected to actuate said electronic control apparatus so as to gradually reduce the peripheral speed of the work piece relative to the speed of the grinding wheel from a rough grinding to a finish grinding speed during a grinding operation.

4. In a grinding machine as claimed in claim 3, in combination with the parts and features therein specified of a fluid pressure piston and cylinder, and means including a cam actuated thereby for imparting a rotary motion to the Selsyn generator rotor so as to produce a continuously changing work motor speed during a grinding operation.

5. In a grinding machine as claimed in claim 3, in combination with the parts and features therein specified of a piston and cylinder, a cam actuated thereby, and means including a follower for said cam to impart a rotary motion to the Selsyn generator rotor so as to produce a continuously changing work motor speed during a grinding operation.

6. In a grinding machine as claimed in claim 3, in combination with the parts and features therein specified of a piston and cylinder, a cam rotated thereby, a follower for said cam to impart a rotary motion to the Selsyn generator rotor, and means including a valve actuated in timed relation with movement of the wheel slide to admit fluid to said cylinder so as to start a rotary movement of the rotor when the wheel moves into engagement with the work.

7. In a grinding machine as claimed in claim 3, in combination with the parts and features therein specified of a piston and cylinder, a cam rotated thereby, means including a nut and screw to adjust said cam, a follower for said cam to impart a rotary motion to the Selsyn generator rotor, and means including a limit switch actuated by movement of said wheel slide to admit fluid to said cylinder so as to impart a rotary motion to said rotor when the grinding wheel moves into engagement with the work to produce a continuously changing speed to the work driving motor.

8. In a grinding machine having a rotatable work support including a headstock, a transversely movable wheel slide, a rotatable grinding wheel thereon, a feeding mechanism to feed said slide in either direction, an adjustable speed motor to rotate a work piece to be ground, an electronic control apparatus for controlling said motor, means including a Selsyn generator and control apparatus for controlling said electronic control apparatus, and means inclduing a cam actuated mechanism to impart a rotary motion to said Selsyn generator rotor so as to produce a continuously changing work speed during a grinding operation.

ALBERT G. BELDEN.

REFERENCES CITED

The following references are of record in the file of this patent:

UNITED STATES PATENTS

| Number | Name | Date |
| --- | --- | --- |
| 1,938,439 | Remington | Dec. 5, 1933 |
| 2,018,847 | Fraser | Oct. 29, 1935 |
| 2,060,437 | Harley | Nov. 10, 1936 |
| 2,131,107 | Krause | Sept. 27, 1938 |
| 2,448,283 | Silven | Aug. 31, 1948 |
| 2,466,022 | Gorton | Apr. 5, 1949 |